March 11, 1952      A. H. LAMB      2,588,394
PERMANENT MAGNET CORE METER
Filed March 26, 1945      3 Sheets-Sheet 1
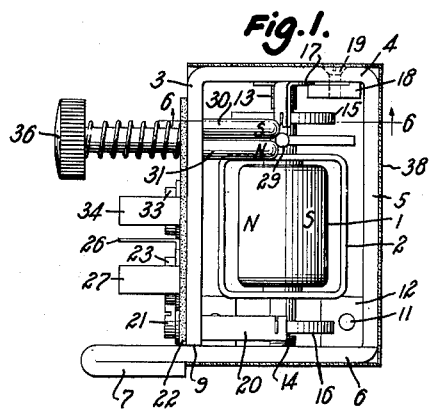
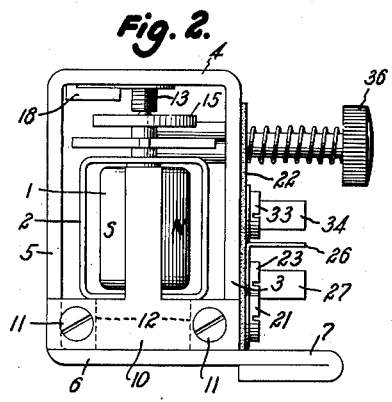
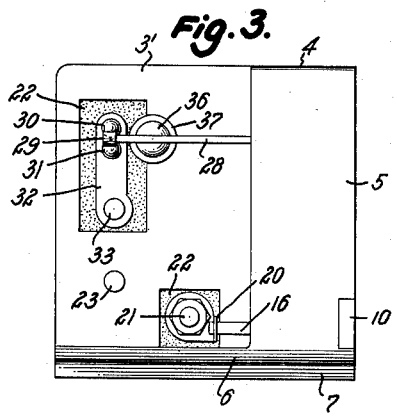
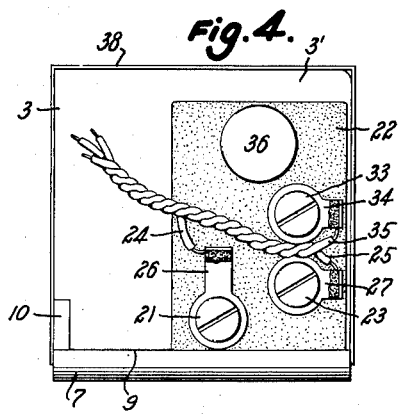
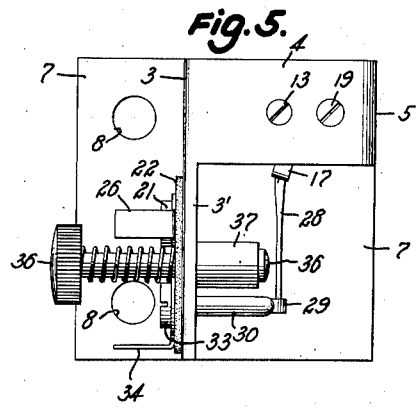
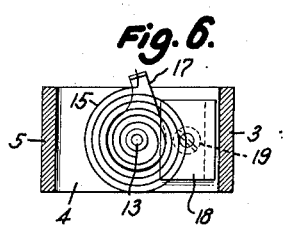
Inventor
Anthony H. Lamb,
By Pierce + Scheffler,
Attorneys.

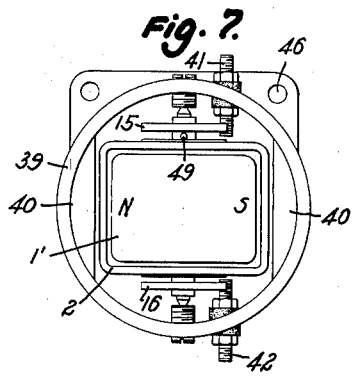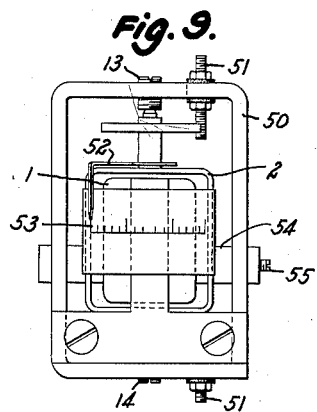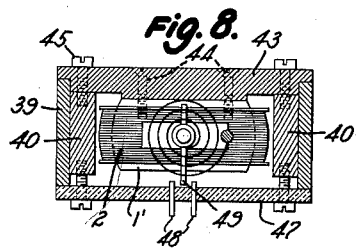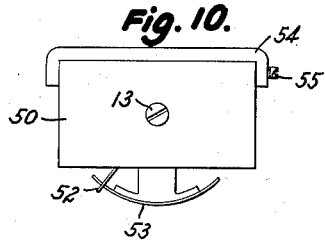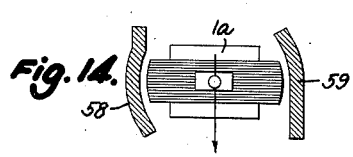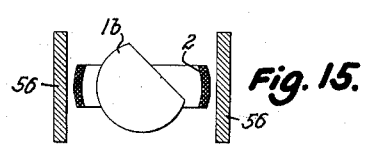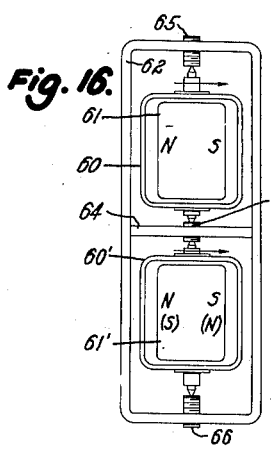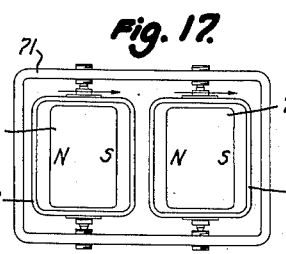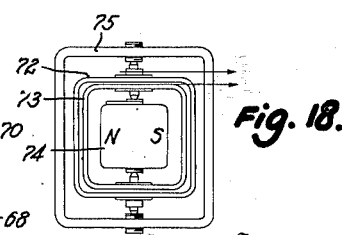

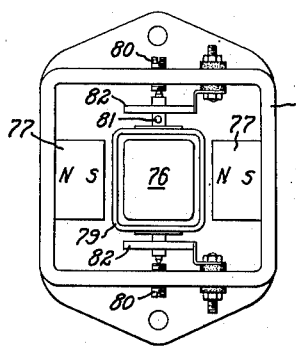
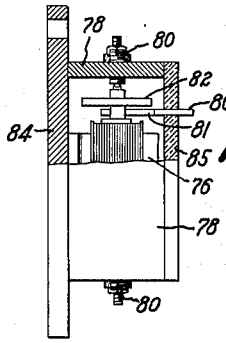
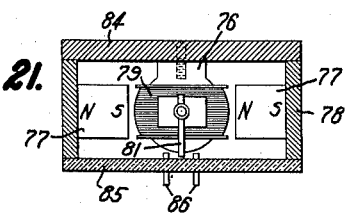
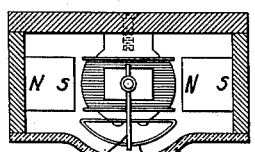
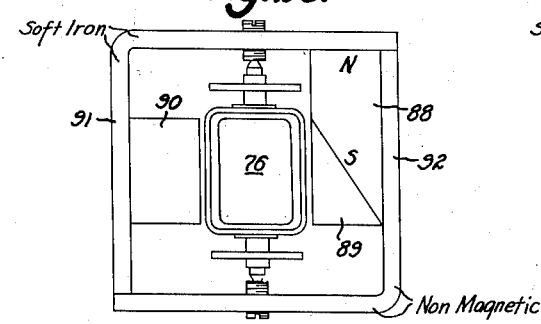
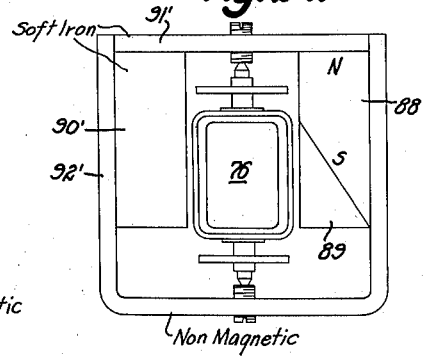

Patented Mar. 11, 1952

2,588,394

UNITED STATES PATENT OFFICE 2,588,394

PERMANENT MAGNET CORE METER

Anthony H. Lamb, Hillside, N. J., assignor to Weston Electrical Instrument Corporation, Newark, N. J., a corporation of New Jersey Application March 26, 1945, Serial No. 584,759

6 Claims. (Cl. 171—95)

This invention relates to electrical measuring instruments and more particularly to instruments of the galvanometer type such as commonly employed for measurement and/or control purposes.

Objects of the invention are to provide electrical measuring instruments, including instrument type relays of novel mechanical construction that may be manufactured in any desired size but that, and preferably, are manufactured in such small size, in comparison with known instruments of the same operational characteristics, that they may be appropriately designated as "miniature instruments." An object is to provide electrical instruments of the galvanometer or permanent magnet-pivoted coil type in which one or more elements of the magnetic circuit constitute a part of the instrument casing and support other elements of the instrument. An object is to provide electrical instruments of the stated type that can be completely assembled prior to the magnetic charging of the permanent magnet system. An object is to provide electrical instruments of the galvanometer type that differ from prior constructions by mounting the pivoted coil within a permanent magnet structure in the form of an open frame having an axis at right angles to the pivotal axis of the coil. Other objects are to provide instruments of the type stated in which the magnetic system includes a yoke in the general form of a frame extending around the pivoted coil in approximately its plane of symmetry when in mid-position, and a core within the coil, either the core or a part or parts of the yoke being permanent magnets.

These and other objects and advantages of the invention will be apparent from the following specification when taken with the accompanying drawings in which:

Figs. 1 and 2 are side elevations, on an enlarged scale and at 180° to each other, of an instrument type relay embodying the invention;

Figs. 3 and 4 are side elevations of the relay as seen from the right and the left sides, respectively, of Fig. 1;

Fig. 5 is a plan view of the relay with the cover removed;

Fig. 6 is a fragmentary sectional view as taken on line 6—6 of Fig. 1;

Figs. 7 and 8 are, respectively, an elevation and a section through another embodiment of the invention;

Figs. 9 and 10 are an elevation and a plan view, respectively, of another embodiment;

Figs. 11 to 15 inclusive are transverse sections through an instrument as shown in Fig. 9 and illustrating various designs for the soft iron yoke of the instrument;

Figs. 16 to 18 are somewhat schematic elevations of the magnetic system and moving coil assemblies of other forms of the invention;

Fig. 19 is a front elevation of a relay, as seen with the transparent cover plate removed, of a relay embodying the invention;

Fig. 20 is a side elevation, partly in section, of the relay of Fig. 19;

Fig. 21 is a transverse section through the Fig. 19 relay;

Fig. 22 is a similar transverse section through a measuring instrument adaptation of the apparatus as shown in Figs. 19 to 21 inclusive; and Figs. 23 and 24 are schematic elevations of other forms of magnetic field structures for incorporation in measuring instruments and relays.

In Figs. 1 to 6 inclusive that illustrate an instrument type relay embodying the invention, the reference numeral 1 identifies the transversely charged cylindrical permanent magnet core of circular or other desired cross-section within a rectangular frame or soft iron yoke that extends around the core 1 and the pivoted coil 2 in substantially the plane of the maximum magnetic intensity of the transversely magnetized core, i. e. the plane of maximum magnetic intensity if extended would pass through the sides and ends of the rectangular frame. The iron yoke may be built up in various ways but preferably comprises an integral yoke and mounting bracket formed by bending a diestamped plate of soft iron to provide a side section 3, top bar 4, side bar 5, and base section 6, the side section 3 and base section 6 being of greater width than the elements 4, 5 and the base section 6 being reversely bent upon itself to provide a rigid mounting bracket 7 having openings 8 for receiving mounting screws. The end of side section 3 is mechanically anchored on the base section 6 of the magnetic material yoke, preferably by weld metal 9. The magnetized core 1 is welded or brazed to the leg of a supporting bracket 10 of inverted T-form that has a cross bar seated in notches of the side members 3, 5 of the soft iron yoke and secured by screws 11, to small gusset pieces 12, Fig. 1, that may be integral with and bent at right angles to the side members 3, 5 or that may be separate pieces of iron or of a non-magnetic metal welded to the side members 3, 5.

The moving coil 2 is supported for pivotal movement about its major axis, which substantially coincides with the cylindrical axis of the magnet core 1, by jeweled bearing screws 13, 14 that are threaded into the upper and lower sections 4, 5 respectively of the iron yoke which extend along and in spaced parallel relation to the short sides or ends of the rectangular coil 2. The electrical connections to the coil winding are made in the conventional manner through the upper and lower spiral springs 15, 16. The outer end of the upper spring 15 is anchored to an arm 17 that is apertured to fit over the upper bearing screw 13 on which it may be turned angularly to provide a zero adjustment of the moving coil. The mounting arm 17 is clamped in the desired adjusted position by a plate 18 and screw 19. The mounting arm 20 of the lower spring 16 is clamped by a terminal screw 21 to a sheet or thin plate 22 of insulating material that is secured to the extension 3' of the yoke bar 3 by the terminal screw 23. Electrical connections to the coil 2 are made by leads 24, 25 that are soldered to lugs 26, 27 on terminal screws 21, 23 respectively. The contact arm 28 of the moving system carries a soft iron rider 29 for cooperation with stationary magnetized contacts 30, 31 that are mounted on a strap 32 secured to the insulating plate 22 by a terminal screw 33 to which an electrical connection is made by a terminal lug 34 and lead 35.

The magnetic contact system is of the general type described in my prior Patents 2,014,385 and 2,193,731, and the illustrated instrument type relay includes a manually operable member 36 that is slidable in a bushing 37, welded to the yoke extension 3', for forcing the magnetic rider 29 of the pointer 28 away from the magnetized stationary contacts 30, 31. The relay is enclosed or housed within a casing formed by the yoke bar 3 and extension 3', and a cup-shaped member 38, of rectangular cross-section conforming to the shape of the iron yoke, that is slipped over the yoke. The cover member 38 is preferably transparent to permit inspection of the relay and, as presently manufactured, is formed of a transparent synthetic plastic. The cover member may be cemented to the yoke to provide a sealed housing for the magnetic system and moving parts of the instrument.

The invention is not limited to any particular instrument size but the marked reduction in overall dimensions and in weight that is made possible by the invention will be apparent from the enlarged scale of Figs. 1 to 6 that illustrate an instrument relay in which the coil 2 is a "standard" coil of 0.25 inch diameter such as employed in conventional instruments and instrument relays housed in cylindrical casings of about 3 inches diameter. The miniature construction imposes no limitations upon the character of the control or indicating device that is carried by the moving coil. It will be apparent that the magnetic contact system is not essential when the electrical values, current or voltage, are of sufficient magnitude to afford good circuit closures with contacts of conventional types. The pointer may carry a blade or vane that serves as one electrode of a small condenser or as the moving core of a small inductance, or the pointer may be associated with a graduated scale for a direct reading of a measured value. Small size is usually of no interest in reflecting galvanometers but, if desired, the moving coil of miniature instruments embodying the invention may carry a small mirror for deflecting a light beam along a graduated scale or with respect to one or more photosensitive devices in a control system.

Another embodiment of the invention, as illustrated in Figs. 7 and 8, includes a magnetized core and a moving system, coil 2 and associated supporting and electrically conductive elements, that may be identical with the previously described embodiment. Like parts are identified by the same reference numerals but will not be described in detail. The yoke is of generally annular form with its axis normal to the axis of the coil 2 and comprises a short tubular section 39 to which segmental pole pieces 40, 40 are welded or brazed. The outer ends of the springs are anchored to terminal studs 41, 42 respectively that extend through and are insulated from the yoke 39. The core 1' is a bar magnet with polar surfaces that may be flat or curved in accordance with the desired sensitivity characteristic. The core 1' is mounted on the non-magnetic back or base plate 43 by screws 44, and the back plate in turn is secured to the yoke 39 by screws 45. Parts of the base plate extend beyond the yoke 39 and are provided with openings 46 for receiving mounting screws. The front plate 47 of the instrument is of glass or a transparent plastic that is secured to the yoke 39 to complete the instrument housing. Stationary relay contacts 48, 48 are molded in, or force fitted into, the transparent front plate 47 for cooperation with a contact arm 49 carried by the moving coil 2.

A measuring instrument embodiment of the invention, as illustrated in Figs. 9 and 10, may include a substantially cylindrical and transversely magnetized core 1 and a coil 2, substantially as shown in Figs. 1 to 6, within a rectangular yoke 50 of soft strip iron. Electrical connections to the coil 2 are made through the springs and terminal studs 51, 51 that are mounted in and insulated from the upper and lower bars of the yoke frame 50. The moving system is pivoted, as in the relay of Figs. 1 to 6, in jewel bearing screws 13, 14 that are threaded into the upper and lower bars of the yoke. The pointer 52 has its outer end turned down at right angles to move along a graduated scale plate 53 that is cemented or otherwise attached to the T-shaped bracket that supports the magnetized core 1. A strap 54 of magnetic material may be adjustably secured to the yoke 50 by a set screw 55 to provide means for adjusting the sensitivity of the instrument.

As shown schematically in Figs. 11 to 15 inclusive, the core and the yoke elements of the magnetic system of the instrument or instrument type relay may be of various shapes and arrangement, as viewed in transverse section, to obtain any desired relation between the moving system displacement and the current input to the instrument. With a core 1a of rectangular cross-section and a soft iron yoke with parallel side bars 56, as shown in Fig. 11, the instrument has a higher sensitivity or expanded scale characteristic at the central region of its angular travel. This characteristic is desirable in zero center instruments and, for a uniform or more nearly uniform scale characteristic, the side bars may be shaped to provide a more uniform flux distribution in the air gaps. Two methods for shaping the side bars are shown schematically in Fig. 12, one side bar 57 of the yoke being cut away at its central portion and the other side bar 57' being bowed outwardly by pressing or die-stamping. Other combinations of side bar shapes may be employed to obtain a desired scale characteristic, for example a bowed side bar 57' and a rectangular side bar 56, Fig. 13. For an expansion of the scale graduation at one end or at both ends of the scale, one or both sets of diametrically opposed edges of the side bars of the yoke may be bent inwardly towards the core. One yoke form, as shown schematically in Fig. 14, may comprise a side bar 58 having a central bowed section with one inturned edge, and a side bar 59 of generally rectangular form with one inturned edge. The desired sensitivity or scale characteristic may be had with "standard" magnetized cores of circular or rectangular cross-section by an appropriate shaping of the side bars of the yoke of, if desired, the magnetized core may be so shaped, for example by cutting a part of a core of circular cross-section to form a core 1b of non-circular cross-section, Fig. 15, to establish or to contribute to the non-uniform flux density at different parts of the air gap along which the coil 2 moves. The several illustrated constructions are indicative of the wide latitude in the geometrical form of the core and yoke, as viewed in transverse section, to obtain a desired scale characteristic. The side bars are relatively thin soft iron strips in a miniature instrument, and they are readily bent or pressed into shape to determine the scale characteristics.

Dual or multiple instruments of small size may be manufactured in the several styles illustrated schematically in Figs. 16 to 18. The coils 60, 60' and their magnetized cores 61, 61' may be axially alined within a common yoke or soft iron frame 62, Fig. 16, and supported for pivotal movement by an inner double-ended bearing screw 63 that is mounted in a cross bar 64 of non-magnetic material and outer bearing screws 65, 66 respectively. The cores 61, 61' may be magnetized, as indicated by the legends "N," "S," either for bucking or boosting action. As shown in Fig. 17, coils 67, 68 and their magnetized cores 69, 70 respectively may be located side by side within a rectangular yoke 71, the coil bearings being mounted on the cores or, as shown, on the yoke. Another dual instrument or instrument relay, as shown schematically in Fig. 18, comprises an outer coil 72 and inner coil 73 having a common magnetic system comprising a magnetized core 74 and a soft iron yoke 75, the outer coil being mounted in bearing jewels carried by the yoke 75 and the inner coil being mounted on bearing jewels within the core 74.

The housings for the several instrument constructions shown schematically in Figs. 11 to 18 may be, and preferably are, of the type illustrated in Figs. 7 and 8, i. e. plates of non-magnetic material, are secured to or over the edges of the yoke to cooperate therewith to form the instrument casing.

Substantial reductions in the overall dimensions are also possible when the magnetic system comprises a soft iron core 76 between permanent magnet pole pieces 77 that are soldered or brazed to a rectangular soft iron frame 78, see Figs. 19 to 22. The coil 79 is supported in jewel bearing screws 80 that are threaded into the upper and lower bars of the yoke 78, and electrical connections are made to the coil and contact arm 81 through the springs 82 and terminal studs 83 that extend through and are insulated from the yoke. The core 76 is fastened to the base or back plate 84 that is brazed or otherwise secured to the yoke frame 78, and the front cover plate is preferably a transparent synthetic plastic that is secured to the yoke frame by cement or screws, not shown. For a miniature relay, as shown in Fig. 21, the cover plate 85 carries the stationary contacts 86, and, when space requirements make it desirable, the cover plate may be flat. For a minature measuring instrument, as shown in Fig. 22, it is preferable to bow the transparent cover plate 85' outwardly to provide space for a longer pointer 87 that has an end turned down to move along the arcuate scale plate 87' that is mounted on the core 76.

Other typical constructions for a magnetic structure including a soft iron core 76 and a composite yoke system are shown schematically in Figs. 23 and 24. The permanent magnet element 88 in both forms is of generally bar or rectangular form with one end cut back at an angle to receive a soft iron pole piece 89. The other pole piece 90, Fig. 23, is of soft iron and brazed or welded to a soft iron yoke 91 that extends along one side of and over the coil 76 into magnetic contact with the upper end of the bar magnet 88. The other side and the base of the supporting frame, which is to constitute the central section of the instrument casing, is an angle-shaped strip 92 of brass or other non-magnetic material. In the Fig. 24 construction, the soft iron pole piece 90' extends upwardly along one side of the U-shaped frame section 92' of non-magnetic material into magnetic contact with the upper frame bar 91' of soft iron. The magnetic system in this form of the invention is of inverted U-shape, but the arrangement may of course be inverted to locate the magnetic system at the base of the instrument.

The several embodiments herein illustrated and described are indicative of the wide latitude in the mechanical and magnetic constructions of the yoke and/or frame that extends around the pivoted instrument coil, in substantially the plane of the coil axis, to constitute a part of the instrument housing and to support other parts of the housing. Various features that are shown independently in separate embodiments may be incorporated in a single instrument and, in particular, the complete soft iron frame of a magnetized core instrument such as typified by the Fig. 9 embodiment may be modified, as indicated in the Fig. 24 embodiment, by substituting non-magnetic material for parts of the frame that need not carry the magnetic flux. This and other modifications of the illustrated constructions that may occur to those familiar with the design and construction of electrical measuring and relay instruments fall within the spirit of my invention as set forth in the following claims.

I claim:

1. A permanent magnet-moving coil instrument comprising a movable coil of rectangular form, a transversely charged cylindrical permanent magnet core within said coil and with the cylindrical axis thereof parallel to the major axis of said coil, said core having a plane of maximum magnetic intensity, a rectangular frame surrounding said coil and core in the plane of maximum magnetic intensity of said core, and bearing means mounted in said rectangular frame to support said coil for pivotal movement about its major axis; said frame comprising soft strap iron providing a return path for the magnetic flux of the permanent magnet, the return path extending along and in spaced parallel relation to a short side of said coil.

2. A permanent magnet-moving coil instrument as recited in claim 1, wherein the cross bar of a T-shaped bracket is secured to and between opposite sides of said frame to support said core.

3. A permanent magnet-moving coil instrument as recited in claim 1, in combination with terminals for said coil carried by said frame, and means insulating one of said terminals from said frame.

4. A permanent magnet-moving coil instrument as recited in claim 1, in combination with a magnetic shunt, and means for adjustably mounting the same on said frame.

5. A permanent magnet-moving coil instrument as recited in claim 1, wherein said frame comprises a unitary strip of soft iron having an end projecting beyond the rectangular frame portion to constitute a mounting bracket.

6. A permanent magnet-moving coil instrument as recited in claim 1, wherein said frame comprises a soft iron strip with the inner surfaces of the long sides thereof planar, parallel to each other and substantially normal to the plane of maximum magnetic intensity of said cylindrical permanent magnet.

ANTHONY H. LAMB.

REFERENCES CITED

The following references are of record in the file of this patent:

UNITED STATES PATENTS

| Number | Name | Date |
|---|---|---|
| 781,945 | Halsey | Feb. 7, 1905 |
| 994,923 | Holmes | June 13, 1911 |
| 1,458,947 | MacGahan | June 19, 1923 |
| 1,782,519 | Sutton | Nov. 25, 1930 |
| 1,792,385 | Matthews | Feb. 10, 1931 |
| 1,804,330 | Faus | May 5, 1931 |
| 1,920,764 | Nickle | Aug. 1, 1933 |
| 1,927,346 | Lawrence | Sept. 19, 1933 |
| 2,221,643 | Lederer | Nov. 12, 1940 |
| 2,312,990 | Miller | Mar. 2, 1943 |
| 2,384,316 | Lamb | Sept. 4, 1945 |